United States Patent
Ushimaru et al.

[11] Patent Number: 5,124,050
[45] Date of Patent: Jun. 23, 1992

[54] METHOD AND APPARATUS FOR REMOVING HYPOCHLOROUS ACID COMPONENTS FROM APPARATUS FOR PROCESSING TAP WATER

[75] Inventors: Shigeo Ushimaru; Machiko Namegaya; Kunio Matsuno; Toshio Ohtsuki, all of Tokyo, Japan

[73] Assignee: Kabushiki Kaisha Toshiba, Kawasaki, Japan

[21] Appl. No.: 615,795

[22] Filed: Nov. 20, 1990

[30] Foreign Application Priority Data

Nov. 22, 1989 [JP] Japan .................. 1-301843

[51] Int. Cl.⁵ .............................. C02F 1/36
[52] U.S. Cl. ...................... 210/748; 204/157.15; 210/754; 210/916; 210/257.1; 422/20; 422/128
[58] Field of Search ............. 55/15, 277; 204/157.15; 210/748, 753–756, 902, 916, 257.1; 422/20, 128

[56] References Cited

U.S. PATENT DOCUMENTS

| 2,717,874 | 9/1955 | Verain | 422/20 |
| 3,109,721 | 11/1963 | Zenner et al. | 210/748 |
| 3,284,991 | 11/1966 | Ploeger et al. | 55/277 |
| 3,676,983 | 7/1972 | Nold | 422/128 |
| 4,032,438 | 6/1977 | Koblanski | 55/277 |
| 4,086,057 | 4/1978 | Everett | 210/748 |
| 4,961,860 | 10/1990 | Masri | 210/748 |

FOREIGN PATENT DOCUMENTS 1602383 12/1970 France ................ 210/748
57-204285 12/1982 Japan .

OTHER PUBLICATIONS

S. Kojima, NHK Books, 1985, "Pursuit of Delicious Water".

Primary Examiner—Peter Hruskoci
Attorney, Agent, or Firm—Foley & Lardner

[57] ABSTRACT

A tap water processing apparatus comprises a water tank for storing tap water, and an ultrasonic oscillator disposed inside the water tank and emitting ultrasonic waves. The tap water contains hypochlorous acid components produced through a chlorine disinfecting process. When processed by the ultrasonic waves generated by the ultrasonic oscillator, the hypochlorous acid components are removed from the tap water.

2 Claims, 5 Drawing Sheets

METHOD AND APPARATUS FOR REMOVING HYPOCHLOROUS ACID COMPONENTS FROM APPARATUS FOR PROCESSING TAP WATER

BACKGROUND OF THE INVENTION

1. Field of the Invention

The present invention relates to a method of removing from tap water hypochlorous acid components that smell of chlorine, and a tap water processing apparatus for effectively processing tap water, including the removal of hypochlorous acid components.

2. Description of the Prior Art

Sources of tap water are freshwater rivers, lakes, swamps, artificial dams, reservoirs, etc. To purify the source water, a water purification plant guides the source water to a sand basin and a filter bed to remove suspended substances, bacteria, iron, manganese, organic substances that smell, etc., from the source water. Even after the removal of these substance, however the water is still active in terms of biochemistry and contains microbes and bacteria. The water must be disinfected, therefore, by adding chlorine thereto. Since river water etc. is very contaminated these days, a large amount of chlorine is frequently used for disinfection.

Article 16 of enforcement regulations of the Japanese City Water Law prescribes that tap water must contain residual chlorine, particularly residual hypochlorous acid. Thus, tap water supplied to homes always contains residual chlorine. In addition, this tap water usually contains trihalomethane, etc., produced by reaction of chlorine with organic substances. Among the residual substances, the chlorine smells bad, and if water contains a large quantity of residual chlorine, the taste of the water is poor.

To remove the residual chlorine, particularly hypochlorous acid that mainly smells bad, from tap water, it is usual to rely on an adsorbing process of a purifier that employs powdered activated carbon, granulated activated carbon, ion-exchange resins, etc., or a volatilizing process such as a bubbling process or a boiling process.

According to the bubbling process, an air pump feeds air into tap water to produce air bubbles in the water. The bubbles contact the hypochlorous acid to cause chemical decomposition, volatilizing and scattering, thereby removing the hypochlorous acid from the tap water.

According to the volatilizing process, tap water of usually 10° to 20° C. is heated to about 100° C. This heated state is maintained until hypochlorous acid components are removed from the tap water. Thereafter, the water is cooled and used for drinking.

The adsorbing process removes hypochlorous acid from tap water with the help of activated carbon or ion-exchange resins. The adsorptive saturation quantity of this process is usually insufficient, or catalytic poison produced by the chemical adsorption of hypochlorous acid quickly deteriorates the adsorptive capacity of the activated carbon or the ion-exchange resin. Water purified in the purification plant or water purified by a volatile component removing method (disclosed in Japanese Laid-open Patent Publication No. 57-204285) still contains various organic substances. The activated carbon or the ion-exchange resin of the adsorbing process also adsorbs these substances, thereby lowering the efficiency of adsorbing hypochlorous acid.

The bubbling method is very costly because it employs an air pump that consumes a large amount of electric power and has a low removing efficiency.

The boiling method requires a boiling process and, therefore, consumes a large amount of energy, thereby increasing processing costs.

SUMMARY OF THE INVENTION

An object of the present invention is to provide a method of efficiently removing hypochlorous acid, that smells bad, from tap water at a low cost and free of maintenance. Another object of the present invention is to provide a tap water processing apparatus of simple structure for efficiently processing tap water to remove hypochlorous acid components, etc.

In order to accomplish these objects, a method of removing hypochlorous components from tap water according to the present invention employs ultrasonic waves to process the tap water and remove hypochlorous acid components produced through a chlorine disinfecting process, from the tap water.

According to one aspect of the present invention, a tap water processing apparatus involves a water tank and an ultrasonic oscillator disposed inside the water tank. The water tank contains tap water, and the ultrasonic oscillator generates ultrasonic waves for processing the tap water. A water containing width of the water tank measured from the ultrasonic oscillator in an ultrasonic wave advancing direction is designed to be smaller than 1.6 times a near sound field limit distance that is intrinsic to the ultrasonic oscillator.

According to another aspect of the present invention, a tap water processing apparatus comprises a water tank for storing tap water, an ultrasonic oscillator for generating ultrasonic waves for processing the tap water, and a reflector for reflecting the ultrasonic waves into the water.

The method of removing hypochlorous acid components from tap water of the present invention is based on the discovery that ultrasonic waves can easily remove foul smelling hypochlorous acid HOCl from tap water.

Ultrasonic waves generated in tap water cause cavitation in the water. The cavitation produces compressive and rarefactive regions in the water due to excessive and negative pressures. Water in the regions of negative pressure forms bubbles of negative pressure. These bubbles are destroyed at once by circumferential water pressure. At this time, the dynamic energy of the destroyed bubbles changes into thermal energy. This energy produces, although a only instantaneously water temperature of several hundreds to several thousands of degrees centigrade. This heat decomposes hypochlorous acid components dissolved in the tap water. This decomposing process is expressed in the following chemical formula:

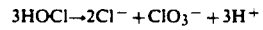

$$3HOCl \rightarrow 2Cl^- + ClO_3^- + 3H^+$$

The bubbles not only generate the high temperature due to this thermal energy, but also provide a deaerating effect. This deaerating effect results from pressure changes caused by the cavitation, shock waves due to vibration of the bubbles, and a separation effect of dissolved components. This effect removes the hypochlorous acid from the tap water according to the following decomposition chemical formula:

$$2H + Cl + ClO \rightarrow H_2O + Cl_2$$

Compared with the adsorbing process employing activated carbon, or the vaporizing process, or the bubbling process, the ultrasonic process of the present invention is inexpensive, maintenance free, and effective and efficient in removing hypochlorous acid components from tap water.

According to the tap water processing apparatus of the present invention, the ultrasonic oscillator is designed to process tap water in a range of 1.6 times a near sound field limit distance that is intrinsic to the ultrasonic oscillator. Within this range, energy of ultrasonic waves effectively spreads in the water tank and processes the tap water that contains hypochlorous acid components.

Ultrasonic waves generated by the ultrasonic oscillator in the tap water have acute directivity, so that they may advance straight and not spread widely. The reflector according to the present invention reflects these ultrasonic waves and spreads them widely in the water tank. The apparatus of the present invention, therefore, can effectively process tap water and remove hypochlorous acid components from the water, with use of a simple structure.

These and other objects, features and advantages of the present invention will be more apparent from the following detailed description of preferred embodiments in conjunction with the accompanying drawings.

DETAILED DESCRIPTION OF THE EMBODIMENTS

A method of removing hypochlorous acid components from tap water by ultrasonic waves will be explained.

A purification plant processes source water to remove suspended substances, bacteria, iron, manganese, and smelly organic substances, from the source water. The purification plant then adds chlorine to the water to disinfect and suppress biochemical activities of microbes, bacteria, etc. This disinfectant process produces hypochlorous acid in the water, and is the reason why the disinfected water smells of chlorine and has a poor taste.

The hypochlorous acid HOCl is produced according to the following chemical formula:

$$Cl_2 + H_2O \rightarrow HOCl + H^+ + Cl^- \quad (1)$$

or $$Ca(OCl)_2 + 2H_2O \rightarrow 2HOCl + Ca(OH)_2 \quad (2)$$

The tap water that contains the hypochlorous acid that smells of chlorine is processed by ultrasonic waves to decompose and remove the hypochlorous acid components from the tap water, thereby eliminating the smell of chlorine.

An ultrasonic process according to the present invention employs an ultrasonic oscillator for generating ultrasonic waves that vibrate tap water. The ultrasonic waves have a frequency of 10 KHz or greater, particularly ranging from 20 to 100 KHz, or from 1 to 3 MHz to provide a better effect. When the frequency of ultrasonic waves exceeds an audible range, no noise due to resonance will be produced.

To effectively process the tap water that contains hypochlorous acid, the water is poured into a water tank provided with the ultrasonic oscillator. A water level or an ultrasonic processing water width in the water tank in a direction orthogonal to the ultrasonic oscillator, i.e., an ultrasonic wave advancing direction is preferably 1.6 times a near sound field limit distance that is intrinsic to the ultrasonic oscillator. This figure of 1.6 has been found through experimentation, which will now be explained.

Figure 1:
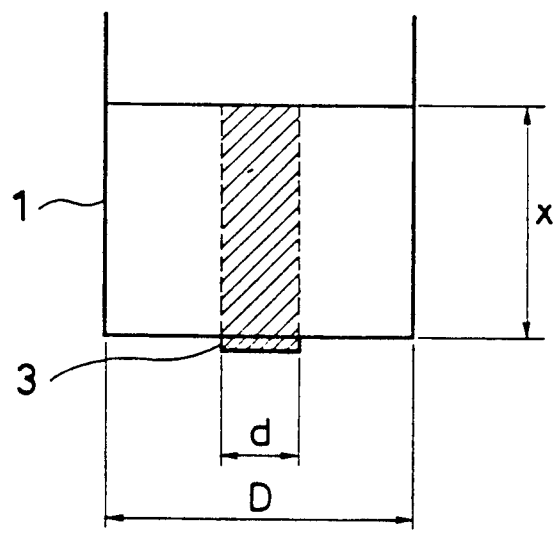
FIG. 1 is a schematic view showing a tap water processing apparatus according to a first embodiment of the present invention.

FIG. 1 shows a testing device for processing tap water and removing hypochlorous acid from the water. An ultrasonic oscillator 3 is fitted to the bottom of a cylindrical water tank 1. A bottom area of the water tank 1 is fixed. Water level is changed vertically relative to the ultrasonic oscillator 3, and a removal ratio of hypochlorous acid is measured with an ultrasonic oscillation input of 50 W, a processing period of 10 minutes, and a frequency of 1.7 MHz.

Figure 2:
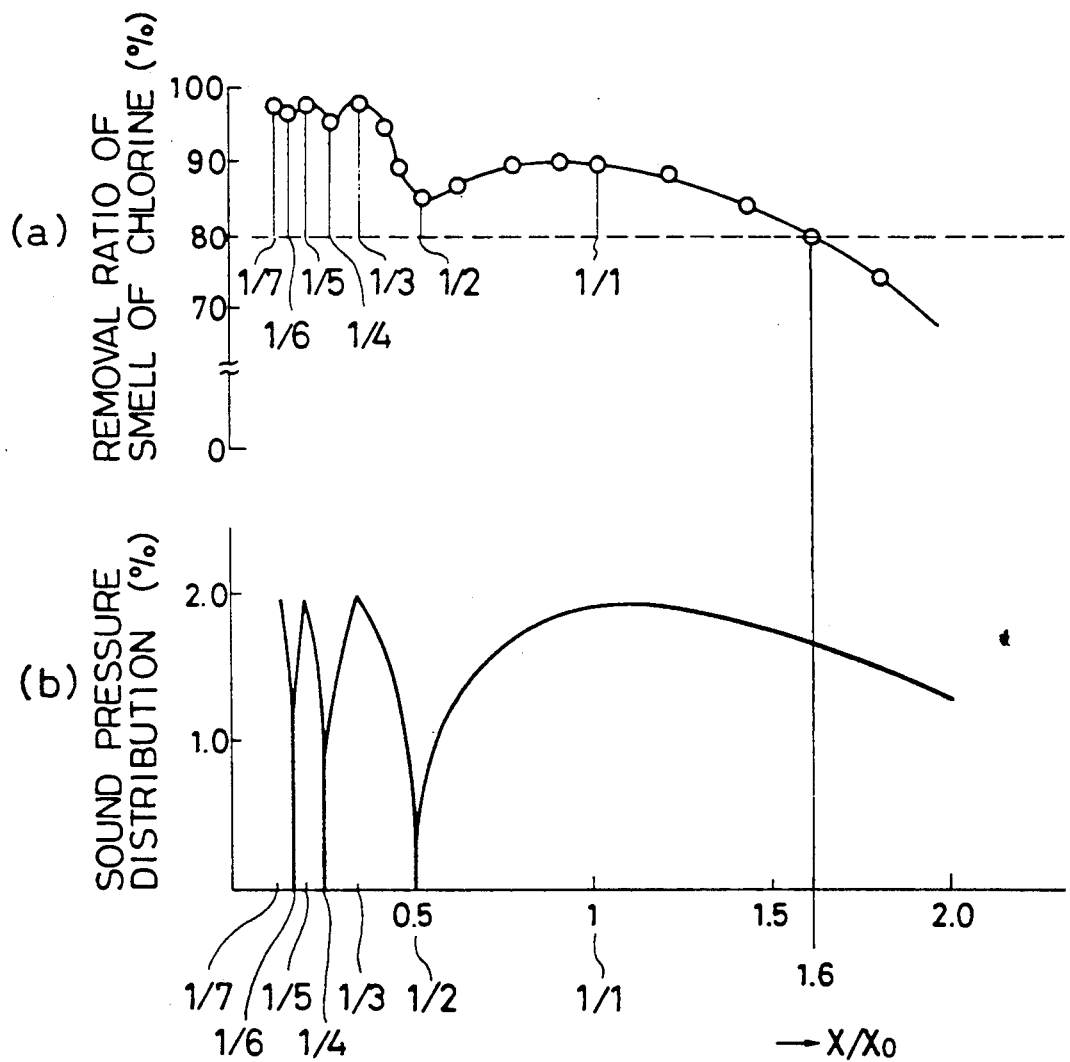
FIG. 2 is a view showing the relationship between changes in water level and removal ratios of hypochlorous acid according to the first embodiment.

FIGS. 2(a) and 2(b) show results of the experiments. FIG. 2(a) tells that a removal ratio of hypochlorous acid changes when the water level changes. With a constant processing period, it is generally said that processing efficiency decreases as processing quantity increases. According to experiments, however, this is not always true. The removal ratio of hypochlorous acid cyclically fluctuates.

FIG. 2(b) shows a sound pressure (strength of sound) of ultrasonic waves generated by the ultrasonic oscillator 3. In FIGS. 2(a) and 2(b), the removal ratio of hypochlorous acid and the sound pressure show similar distributions of ridges and roots. The sound pressure shows a complicated distribution in the vicinity of the ultrasonic oscillator 3. This is because, in the vicinity of the oscillator 3, distances from individual points on the oscillator 3 to a measuring point differ from one another to cause interference of waves. Ridges and roots repeat alternately on the center line of the oscillator, and the position of the last ridge is called a near sound field limit distance $X_0$.

It is understood that ridges and roots on the curve of removal ratio of hypochlorous acid of FIG. 2(a) correspond to ridges and roots on the curve of sound pressure of FIG. 2(b). It will be said, therefore, that the removal ratio of hypochlorous acid correlates to the sound pressure distribution of the ultrasonic oscillator 3. This means that, even if the water level is high, the removal ratio of hypochlorous acid will not decrease, if the high sound pressure positions are effectively utilized.

In one experiment of removing hypochlorous acid components from tap water by ultrasonic waves, the inventors employed an ultrasonic cleaner of VELVO CLEAR COMPANY. This cleaner can change the wavelength of ultrasonic waves in three steps. Sample water containing hypochlorous acid of 1 ppm was put in a water tank and processed by ultrasonic waves. Before and after the ultrasonic processing, residual dissolved components in the sample water were measured with ion chromatography. It was confirmed in this experiment that the ultrasonic waves could decompose and remove the hypochlorous acid from the sample water.

The decomposing and removing actions of hypochlorous acid by ultrasonic waves will be considered.

Ultrasonic waves cause cavitation in water. This cavitation produces compressive and rarefactive regions in the water due to excessive and negative pressures. Water in the regions of negative pressure is torn to form bubbles of negative pressure. The bubbles are destroyed at once by circumferential water pressure. the dynamic energy of the destroying bubbles changes into thermal energy. This thermal energy produces, although instantaneous, a temperature of several hundreds to several thousands degrees centigrade. This heat decomposes hypochlorous acid components dissolved in the water according to the following chemical formula:

$$3HOCl \rightarrow 2Cl^- + ClO_3^- + 3H^+ \quad (3)$$

In removing hypochlorous acid components from tap water, the ultrasonic oscillator is fitted to a water tank, and each time when the tank is filled with tap water, the ultrasonic oscillator is activated to process the filled water by ultrasonic waves. Alternatively, the water tank may have an inlet and outlet for passing tap water, and the ultrasonic oscillator may continuously generate ultrasonic waves to process the water.

The maximum concentration of hypochlorous acid in tap water in Japan is said to be 2.0 ppm, and an average concentration is about 0.8 to 1.0 ppm although it has local fluctuations. According to "Search for Delicious Water" by Sadao Kojima, NHK books, 1985, a threshold of hypochlorous acid in tap water is 0.4 ppm, and if water has a concentration of hypochlorous acid lower than the threshold, one can drink the water without sensing a bad smell. Namely, to make tasty water, an effective removal ratio of hypochlorous acid must be about 80%.

According to the results of the experiments shown in FIGS. 2(a) and 2(b), the removal ratio of 80% is secured up to the position of 1.6 times the near sound field limit distance $X_0$. Based on this experimental discovery, it is determined that an effective processing distance on the center line of an ultrasonic oscillator must be smaller than 1.6 times the near sound field limit distance $X_0$ of the ultrasonic oscillator. It is preferable from this theory to position an ultrasonic reflector, if required, in a water tank at a distance less than 1.6 times the near sound field limit distance $X_0$ from the ultrasonic oscillator on the center line thereof. By effectively selecting the effective processing distance (an ultrasonic processing water width), the removal ratio of hypochlorous acid improves.

The first embodiment of the tap water processing apparatus of the present invention is based on the above experimental results.

Figure 3:
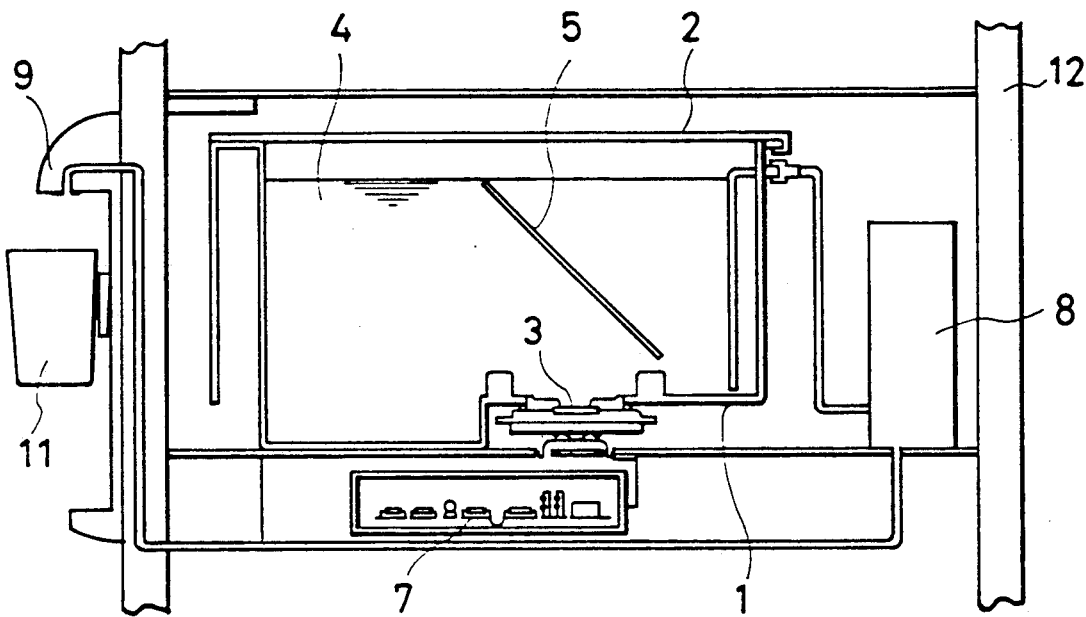
FIG. 3 is a sectional view showing a tap water processing apparatus according to a second embodiment of the present invention.

FIG. 3 shows a tap water processing apparatus according to the second embodiment of the present invention. The tap water processing apparatus of this embodiment serves as a delicious water supplying apparatus in a refrigerator.

In FIG. 3, a refrigerator 12 accommodates a water tank 1 having a lid 2. When water in the water tank 1 is processed by ultrasonic waves, a water column is formed on the water surface to splash water. This may quicken water consumption and wet the periphery of the water tank 1. To prevent this, the water tank 1 needs the lid 2. An ultrasonic oscillator 3 is disposed on the bottom of the tank 1. Above the ultrasonic oscillator 3, a reflector 5 is disposed to reflect ultrasonic waves generated by the ultrasonic oscillator 3 into tap water in the water tank 1.

The ultrasonic oscillator 3 of FIG. 3 has an effective diameter of 15 mm and a frequency of 1.7 MHz. A near sound field limit distance $X_0$ of the ultrasonic oscillator 3 is about 64.5 mm, which is derived from the following equation:

$$\begin{aligned}
\lambda &= c/f = (1.482 \times 10^6)/(1.7 \times 10^6) \\
X_0 &= a^2/\lambda \\
&= (7.5^2/[(1.482 \times 10^6)/(1.7 \times 10^6)] \\
&= 64.5 \text{ mm}
\end{aligned}$$

where
f = 1.7 MHz
water temperature = 0° C.
c = $1.482 \times 10^6$ mm/s
a = effective element radius = 7.5 mm When the reflector 5 of the tap water processing apparatus of FIG. 3 is removed, water level on the center line of the ultrasonic oscillator 3 is about 60 mm. When the reflector 5 is set to provide an incident angle of 45 degrees, ultrasonic waves reflected by the reflector 5 advance in parallel with the surface of the water and provide a hypochlorous acid removing effect. In this case, a distance from the ultrasonic oscillator 3 to the reflector 5 is about 40 mm, and a distance from the reflector 5 to a wall of the water tank 1 to which the reflected ultrasonic waves reach is about 60 mm. A total of these distances, i.e., an effective processing width is about 100 mm, which is less than 1.6 times the near sound field limit distance $X_0$ (64.5 mm).

Figure 5:
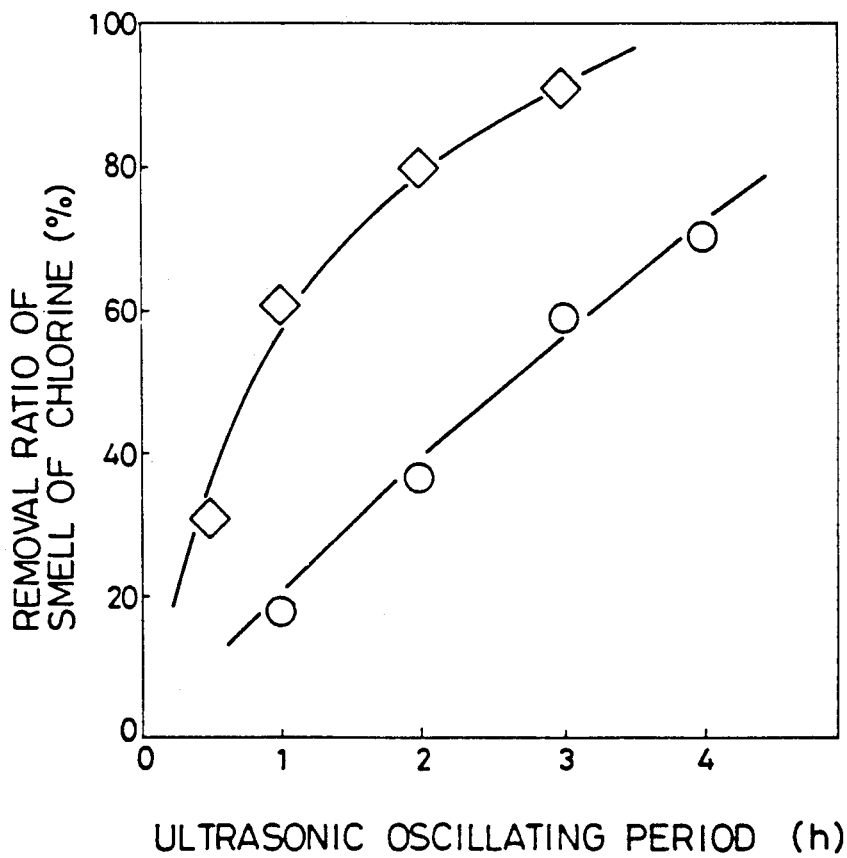
FIG. 5 is a graph showing the relationship between ultrasonic oscillating periods and removal ratios of hypochlorous acid with or without a reflector.

As will be explained in more detail with reference to FIG. 5, the reflector 5 improves the hypochlorous acid removing effect because it effectively utilizes the near sound field limit distance $X_0$.

In FIG. 3, the reflector 5 is disposed to provide an incident angle of about 45 degrees for ultrasonic waves. With this arrangement, the incident angle is equal to a reflection angle, so that reflected ultrasonic waves advance in parallel with the surface of water, thereby improving the hypochlorous acid removing effect. The inclination of the reflector 5 may range from 10 to 80 degrees. At any angle, ultrasonic waves will not be reflected 100% by the reflector 5 but partly transmit the reflector.

The reflector 5 may be made of metal material such as stainless steel, steel, nickel, and copper. These metal materials may increase the difference between an acoustic impedance of water and an acoustic impedance of the reflector 5, thereby improving reflective efficiency. Among these materials, the stainless steel is preferable because the reflector is in direct contact with the tap water and the ultrasonic waves.

The reflector 5 may be made of plastic, wood, rubber, etc. With these materials, an acoustic impedance of the reflector 5 comes closer to the acoustic impedance of water, thereby increasing reflective efficiency and increasing the transmission ratio of incident ultrasonic waves. The ultrasonic waves transmitted by the reflector 5 process the tap water 4 above the reflector 5.

The surface of the reflector 5 is preferably finished smoothly to provide unidirectional reflected waves. Irregularities on the surface of the reflector 5 diffuse ultrasonic waves, and the ultrasonic waves may not reach corners of the water tank 1 or cancel incident waves.

Ultrasonic waves form a column of water on the surface of the tap water 4. Since edge of the water column has high energy, it may damage the lid 2. The reflector 5 prevents the formation of such a water column, thereby protecting lid 2.

In FIG. 3, an electric circuit 7 includes an oscillating circuit for generating a high-frequency voltage that drives the ultrasonic oscillator 3. A gear pump 8 pumps up processed water from the water tank 4, and dispenser 9 pours the water into a cup 11.

The water tank 1, with tap water 4, is disposed inside the refrigerator 12. The ultrasonic oscillator 3 driven by the high-frequency voltage generates ultrasonic waves of inaudible frequency, which advance straight without scattering because of their acute directivity. The ultrasonic waves are reflected by the reflector 5 before reaching the surface of the water 4, and propagate widely in the water 4 inside the water tank 1. With this simple structure of the single ultrasonic oscillator 3 and the reflector 5 in the water tank 1, a large amount of tap water 4 is effectively processed by ultrasonic waves, and hypochlorous acid components, etc., are removed from the water, thereby providing delicious water.

Figure 4:
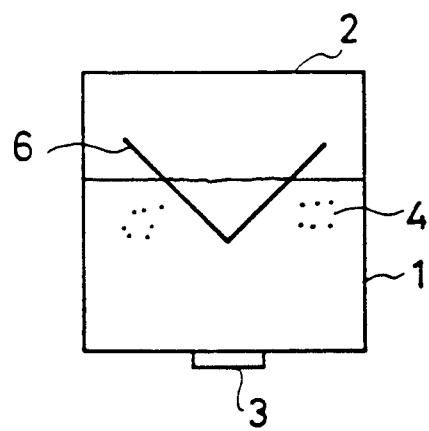
FIG. 4 is a schematic view showing a tap water processing apparatus according to a third embodiment of the present invention.

FIG. 4 shows a tap water processing apparatus according to the third embodiment of the present invention. A reflector 6 of this embodiment is formed into a V shape. With an ultrasonic oscillator 3 disposed at the center of the bottom of a water tank 1, the V shaped reflector 6 reflects incident waves in left and right directions in the water tank 1, thereby widely spreading the waves in tap water 4, thus improving processing efficiency.

The reflectors 5 and 6 of FIGS. 3 and 4 may be omitted to form a water processing apparatus having no reflector.

Figure 6:
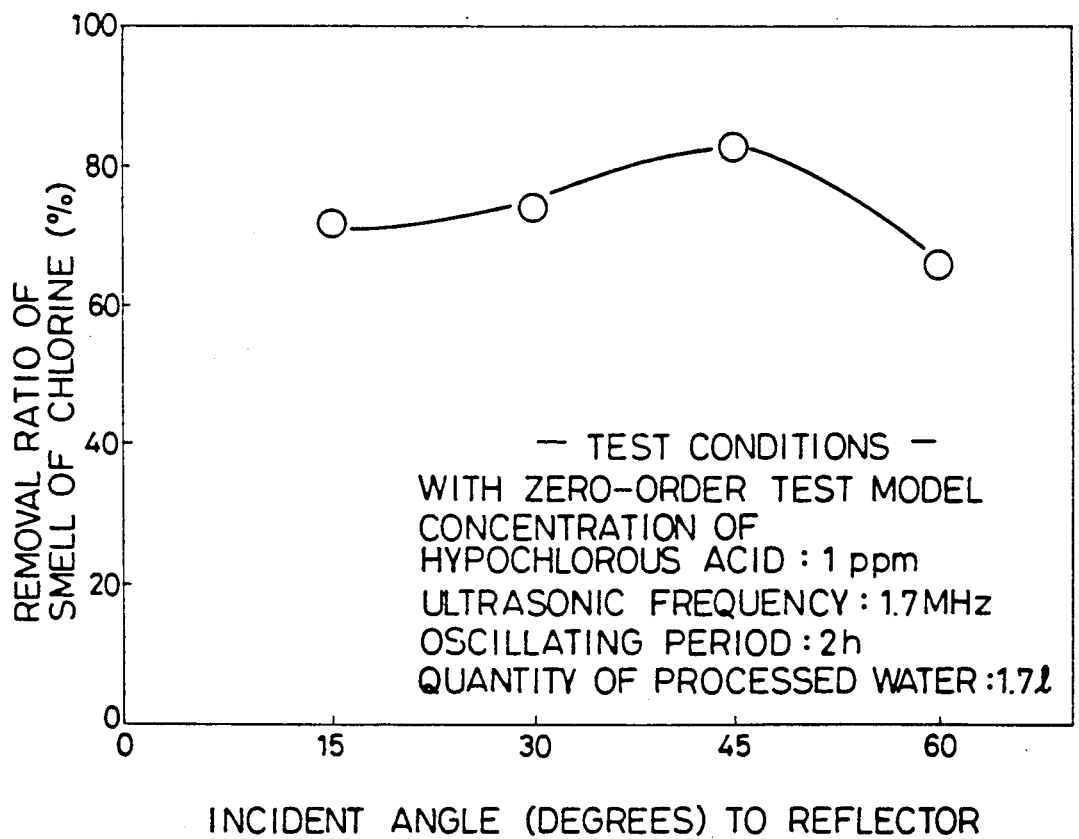
FIG. 6 is a graph showing the relationship between incident angles of an ultrasonic wave on a reflector and removal ratios of hypochlorous acid.

Various water processing examples using the apparatuses of FIGS. 5 and 6 will be explained.

EXAMPLE 1

No reflector was used, and constant water level was maintained. Relationships between removal ratios of hypochlorous acid and oscillation periods were studied. An ultrasonic cleaner manufactured by SHINMEIDAI KOGYO COMPANY was used. A water tank was filled with sample water of 1.5 liters containing hypochlorous acid of 1 ppm. The sample water was oscillated by ultrasonic waves of 28 KHz frequency. A concentration of hypochlorous acid was measured according to an orthotolidine method prescribed in the Japanese Water Quality Standard Law. An oscillation period was changed within a range from 10 to 80 minutes. Results of the example 1 are shown in Table 1. As is apparent in the table, the removal ratio of hypochlorous acid increases as the oscillation period increases.

TABLE 1

| Oscillation period (min.) | Removal ratio (%) |
|---|---|
| 10 | 30 |
| 20 | 48 |
| 30 | 67 |
| 40 | 89 |
| 50 | 96 |
| 60 | 97 |
| 80 | 98 |

EXAMPLE 2

No reflector was used. An ultrasonic cleaner of VELVO CLEAR COMPANY that could change the wavelength of an ultrasonic wave in three steps was used. A water tank was filled with sample water of 1.0 liter containing hypochlorous acid of 1 ppm. The sample water was oscillated by ultrasonic waves at different frequencies (28, 45, and 100 KHz), and removal ratios of hypochlorous acid were measured. An oscillation period was kept at 30 minutes. Results of the example 2 are shown in Table 2. As is apparent in the table, the most effective frequency is 28 KHz.

TABLE 2

| Frequency (KHz) | 28 | 45 | 100 |
|---|---|---|---|
| Removal ratio (%) | 73 | 50 | 30 |

EXAMPLE 3

A reflector made of SUS was used and inclined to form an ultrasonic incident angle of 45 degrees. A water tank was filled with sample water of 1.7 liters dissolving sodium hypochlorous acid of 1 ppm. The sample water was processed for two hours by ultrasonic waves of 1.7 MHz in frequency and 27 W in output power. Thereafter, a concentration of sodium hypochlorous acid in the sample water was measured to find a removal ratio of chlorine smelling components. A result of the measurement is shown in Table 3 and FIGS. 5 and 6. Even with the frequency of 1.7 MHz, a ratio of mist was not so great, because the water quantity was 1.7 liters.

EXAMPLE 4

No reflector was used, but other conditions were the same as those of the example 3. Results are shown in Table 3 and FIG. 5. The results of the examples 3 and 4 tell that the reflector made of SUS inclined by 45 degrees remarkably improves the removal ratio of chlorine smelling components.

EXAMPLE 5

A reflector was arranged, and inclined differently to form ultrasonic incident angles of 15, 30, 60, and 75 degrees. Other conditions were the same as those of the example 3. Results of the example 5 are shown in Table 3 and FIG. 6. It is understood from the results that an ultrasonic incident angle in a range from 15 to 60 degrees provides a greater removal ratio of chlorine smelling components compared with the case of no reflector, and that an ultrasonic incident angle greater than 75 degrees deteriorates the removal ratio.

EXAMPLE 6

A reflector made of polypropylene (P.P) was used. Other conditions were the same as those of the example 3. Results of the example 6 are shown in Table 3. The polypropylene reflector has a large transmission ratio of ultrasonic waves and a small reflectivity of ultrasonic waves. This reflector still provides a large removal ratio of chlorine smelling components, compared with the example of no reflector.

TABLE 3

| | Material of reflector | Incident angle (degrees) | Removal ratio of chlorine smelling components (%) |
|---|---|---|---|
| Example 3 | SUS | 45 | 80 |
| Example 4 | None | — | 39 |
| Example 5 | SUS | 15 | 73 |
| " | " | 30 | 74 |
| " | " | 60 | 66 |
| " | " | 75 | 33 |
| Example 6 | P.P | 45 | 63 |

EXAMPLE 7

The same apparatus as that of the example 3 was used. Sample water of 1500 cc dissolving chloroform of about 20 ppb was processed for two hours by ultrasonic waves. Thereafter, a concentration of chloroform in the sample water was measured to find a removal ratio of the chloroform. A result is shown in Table 4.

TABLE 4

| | Material of reflector | Incident angle (degrees) | Removal ratio (%) |
|---|---|---|---|
| Example 7 | SUS | 45 | 95 |
| Example 8 | None | — | 51 |
| Example 9 | SUS | 15 | 75 |
| " | " | 30 | 74 |
| " | " | 60 | 71 |
| " | " | 75 | 52 |

EXAMPLE 8

The same apparatus as that of example 4 was used, and the same process as that in example 7 was carried out. The result is shown in Table 4.

EXAMPLE 9

Similar to example 5, a reflector was inclined to provide ultrasonic incident angles of 15, 30, 60, and 75 degrees. Other conditions were the same as those of the example 7. Results are shown in Table 4.

From the results of the examples 7 to 9, it is understood that the ultrasonic processing apparatus of the present invention of simple structure can effectively remove not only the hypochlorous acid but also other dissolved substances.

In summary, the method of removing hypochlorous acid from tap water according to the present invention employs ultrasonic waves to process tap water and remove hypochlorous acid components from the tap water. Compared with the adsorbing process using activated carbon and the vaporizing method using bubbling, the method of the present invention is inexpensive, maintenance free, and efficient in removing hypochlorous acid components from tap water and providing delicious water.

According to one aspect of the present invention, a water tank of a tap water processing apparatus is so sized that the water containing width of the water tank measured from an ultrasonic oscillator that is disposed inside the water tank, in the advancing direction of an ultrasonic wave is smaller than 1.6 times a near sound field limit distance that is intrinsic to the ultrasonic oscillator. This design can effectively propagate energy of ultrasonic waves in the water tank and effectively process tap water contained in the water tank to remove hypochlorous acid components, etc., from the tap water.

According to another aspect of the present invention, a tap water processing apparatus comprises a water tank for storing tap water, an ultrasonic oscillator for generating ultrasonic waves for processing tap water, and a reflector for reflecting the ultrasonic waves into the water. This arrangement widely propagates the ultrasonic waves that usually advance linearly, and effectively processes the tap water by the ultrasonic waves to remove hypochlorous acid components, etc., from the tap water with simple structure.

Various modifications will become possible for those skilled in the art after receiving the teachings of the present disclosure without departing from the scope thereof.

What is claimed is:

1. A tap water processing apparatus comprising:
   (a) a water tank for storing tap water;
   (b) an ultrasonic oscillator disposed inside said water tank and emitting ultrasonic waves of 10 KHz or greater for processing the tap water to remove hypochlorous acid components; and
   (c) a reflector disposed inside said water tank to reflect ultrasonic waves emitted by said ultrasonic oscillator into the tap water at such a position that a distance between said ultrasonic oscillator and said reflector in an ultrasonic wave advancing direction is smaller than 1.6 times the limit distance of a near sound field, said limit distance being the position of a last ridge of sound pressure distribution generated by said ultrasonic oscillator.

2. A method of removing hypochlorous acid components from chlorinated tap water, comprising the steps of:
   disposing an ultrasonic oscillator in a water tank;
   disposing a reflector in said water tank at such a position that the distance between said ultrasonic oscillator said reflector in an ultrasonic wave advancing direction is less than 1.6 times the limit distance of a near sound field, said limit distance being the position of the last ridge of sound pressure distribution generated by said ultrasonic oscillator;
   generating ultrasonic waves having a frequency of 10 KHz or greater to process the tap water that contains said hypochlorous acid components produced through a chlorine disinfecting process, thereby removing said hypochlorous acid components from the tap water.

* * * * *